Sept. 26, 1967   B. J. MAYLAND ET AL   3,344,050
REMOVAL OF CARBON DIOXIDE FROM GASEOUS ATMOSPHERES
Filed Feb. 3, 1964   3 Sheets-Sheet 1

INVENTOR.
BERTRAND J. MAYLAND AND
ROBERT JOHN STEINBERGER,
BY Jungblut, Melville,
Strasser & Foster
ATTORNEYS.

INVENTOR.
BERTRAND J. MAYLAND AND,
ROBERT JOHN STEINBERGER,
BY
*Yungblut, Melville,*
*Strasser & Foster*
ATTORNEYS.

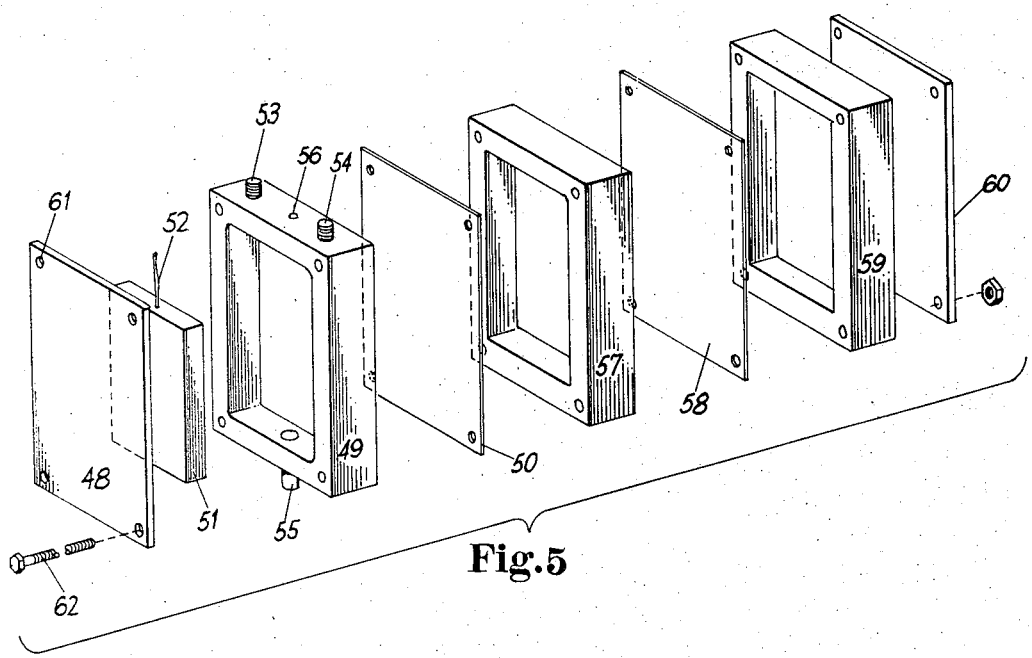

United States Patent Office 3,344,050
Patented Sept. 26, 1967

3,344,050
REMOVAL OF CARBON DIOXIDE FROM
GASEOUS ATMOSPHERES
Bertrand J. Mayland, Jefferstown, and Robert John Steinberger, Middletown, Ky., assignors to Girdler Corporation, Cincinnati, Ohio, a corporation of Ohio
Filed Feb. 3, 1964, Ser. No. 342,072
8 Claims. (Cl. 204—98)

In the chemical arts it is often desired to remove carbon dioxide from process gases and the like. This is usually accomplished by scrubbing the gases in a suitable tower with a water solution of a reagent capable of reacting with carbon dioxide. Potassium carbonate is frequently used. It reacts with carbon dioxide to form potassium bicarbonate in solution, which may be regenerated by driving off the excess carbon dioxide and either venting it or collecting it for some other usage.

Another type of solution frequently employed for scrubbing the gases is a solution containing an ethanolamine. Such a solution can also be regenerated.

In a copending application of Bertrand J. Mayland, one of the inventors herein, Serial No. 104,559, filed April 21, 1961, now Patent 3,144,301 entitled The Removal of Carbon Dioxide From Gaseous Mixtures, it is taught, inter alia, that the addition of a small quantity of ethanolamine, such as monoethanolamine or diethanolamine, to a solution of potassium carbonate, increases the efficiency of the absorption or stripping system.

Various carbon dioxide removal systems have been devised which are capable of removing this gaseous constituent to various final levels in the treated process gases. It is a primary object of this invention to provide a process and apparatus for the general purpose described which is compact and efficient, requiring comparatively small apparatus.

One of the uses for a carbon dioxide stripping system is the purification of air in submarines. Here the requirements are stringent. Space is at a premium, and it is necessary that the apparatus used be of small size. The carbon dioxide content of the treated atmosphere must be reduced to a very low level. The treated atmosphere must also be free of fumes which would produce odors or toxic effects; and this immediately rules out the use of organic stripping materials such as the ethanolamines. This invention will be described in connection with an apparatus and process suitable for use in a submarine or other restricted space such as a fallout shelter, it being understood, however, that the principles of the invention can equally well be applied to commercial uses such as the treatment of process gases, with savings in equipment, cost of operation and efficiency.

Other objects of the invention include the provision of a stripping solution which is essentially free of volatile materials excepting water, so that the treated atmosphere will not be contaminated, the provision of apparatus which is small and compact, the provision of a system with high rates of absorption, and the provision of a system having reasonable energy requirements.

These and other objects of the invention, which will be set forth hereinafter or will be apparent to one skilled in the art upon reading these specifications, are accomplished in that process and apparatus combination of which the aforesaid exemplary embodiment will now be described. Reference is made to the accompanying drawings wherein:

FIG. 5 is a partial exploded view of a specific form of electrolytic cell useful in practicing the invention.

As has been indicated, a solution of potassium carbonate, when used in a scrubber or absorber tower, can be regenerated when spent by the use of heat. But a solution of potassium carbonate has comparatively low absorption efficiency, which requires the use of apparatus of considerable bulk and cost. It has been known, of course, that a solution of potassium hydroxide is a relatively efficient absorption medium for carbon dioxide; but such a solution, when spent, cannot be regenerated in the same way as can a solution containing potassium bicarbonate. The present invention is based upon the discovery that the efficiency of absorption of a potassium carbonate solution can be very greatly increased by the addition of a relatively small quantity of potassium hydroxide, and upon the use of electrolytic means as a regeneration system for driving off carbon dioxide and regenerating potassium hydroxide. These factors permit the use of very small and compact apparatus, the overall volume reduction being of the order of 25% to 50% as compared with an absorption apparatus using a solution of potassium carbonate alone. While reference is made herein to potassium carbonate and potassium hydroxide as the preferred materials, it will be understood that the carbonates and hydroxides of sodium or other alkali metals or mixtures thereof with potassium compounds may be employed.

Potassium carbonate, as has been indicated, has a relatively slow rate of absorption, so that at normal or room temperatures excessively large absorption towers or columns are required for a given carbon dioxide duty. The rates of absorption can be improved by the use of elevated temperatures, but this is expensive and, under some circumstances, inconvenient. Another disadvantage is the relatively high carbon dioxide vapor pressure of the conventionally regenerated solution, which is especially troublesome when the absorption is carried out at elevated temperatures to increase the rate of reaction. Thus, the conventional system is best for treating gases having a high carbon dioxide partial pressure arising either from a high content of carbon dioxide or from elevated pressure levels. Another disadvantage lies in the relatively high energy required for regeneration.

Figure 1:
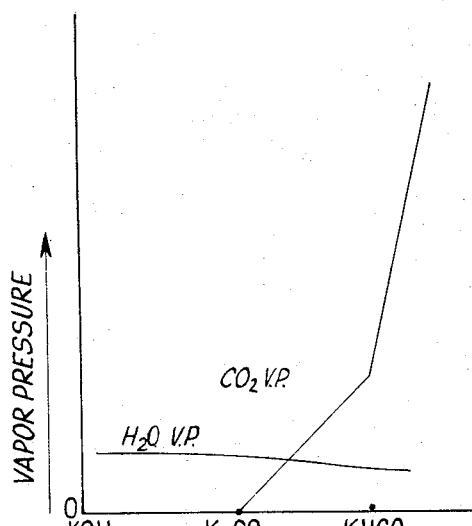
FIG. 1 is a chart indicating the vapor pressure relationships of water and carbon dioxide in connection with solutions of potassium-bearing absorbing substances.

Potassium hydroxide reacts directly with carbon dioxide to form potassium carbonate. Potassium carbonate in the presence of water will react with carbon dioxide to form potassium bicarbonate or potassium acid carbonate. The first of these reactions is not reversible. Hence, the solution of potassium carbonate has negligible carbon dioxide vapor pressure. The second reaction is reversible. The solution will have a carbon dioxide vapor pressure increasing with the content of potassium bicarbonate. These relationships are shown diagrammatically in FIG. 1 where the carbon dioxide vapor pressure is plotted against increasing amounts of carbon dioxide in the solution. FIG. 1 also shows that the vapor pressure of water drops off gradually with an increasing content of carbon dioxide in the solution. This occurs because of the depressing effect of the higher ion concentration; and it introduces a limitation on the energy efficiency which can be obtained in conventional regeneration. Water will be stripped from the potassium bicarbonate solution along with carbon dioxide.

Considerable studies have been made of the action of additives to sodium carbonate solutions for absorption and subsequent stripping. These additives include the ethanolamines and other organic agents such as sucrose and various compounds of arsenic, tellurium, selenium and the like. For purposes of this invention in the exemplary usage, such additives should be avoided for obvious reasons. In other usages, however, such as the commercial treatment of process gases, additives may be employed if desired.

In the practice of this invention, it has been found that the use of a small amount of free hydroxide is as effective as or more effective than most other additives in increasing the efficiency of absorption. This is shown in the following Table I which contrasts the use of sodium carbonate solutions with and without ethanolamine additives and with and without free hydroxide.

FEED—92.91% $N_2$, 7.09% $CO_2$

| Solution | Temp., °F. | Rate, cc./min. | Outlet, percent $CO_2$ |
|---|---|---|---|
| 18.99% $K_2CO_3$, 1.52% KOH | 154 | 305 | 0.27 |
| 22.22% $K_2CO_3$, 0.54% $KHCO_3$ | 146 | 305 | 1.14 |
| 19.14% $K_2CO_3$, 0.27% $KHCO_3$ | 106 | 150 | 1.60 |
| 16.4% $KC_2O_3$ | 75 | 150 | 3.42 |
| 16.4% $KC_2O_3$ | 75 | 305 | 3.50 |
| 11.73% $KC_2O_3$, 4.45% KOH | 75 | 305 | .45 |
| 14.21% $KC_2O_3$, 2.35% KOH | 75 | 305 | .81 |
| 15.0% MEA, 2.64 s.c.f./gal $CO_2$ | 75 | 305 | .49 |
| 32.8%, 6.438 s.c.f./gal* | 75 | 305 | .56 |
| 26.0% $K_2CO_3$ | 75 | 305 | 3.61 |
| 24.84% $K_2CO_3$, 2.96% KOH | 75 | 305 | 0.1 |
| 27.48% $K_2CO_3$, 0.94% KOH | 75 | 305 | 0.1 |
| 27.93% $K_2CO_3$, 0.58% KOH | 75 | 305 | 0.8 |
| 28.57% $K_2CO_3$, 0.12% KOH | 75 | 305 | 1.40 |
| 15.0% DEA, 1.72 s.c.f. $CO_2$/gal | 75 | 305 | 2.24 |
| 30.0% DEA, 3.15 s.c.f. $CO_2$/gal | 75 | 305 | 1.4 |

*Operating concentration in a recent submarine unit test.

In the above table, MEA and DEA indicate respectively monoethanolamine and diethanolamine.

It will be seen, for example, that at 150° F. a potassium carbonate solution of 18% to 20% concentration and containing from 1% to 2% potassium hydroxide does a better absorption job than the partially converted MEA solutions frequently used in submarine units. A potassium carbonate solution approaching 28% concentration with as little as 0.94% free hydroxide is much more effective even at room temperature.

The use of potassium carbonate solution containing free hydroxide as an absorption medium implies the use of a regeneration system capable of releasing carbon dioxide and of regenerating the hydroxide. This may be done electrolytically; but the use of a simple electrolytic cell is not feasible because, among other disadvantages, such a cell would release a gaseous mixture of carbon dioxide, hydrogen and oxygen. As a consequence, in the practice of this invention, recourse is had to electrodialysis which, even in its simplest form, results in the separate release of hydrogen from one compartment and the release of carbon dioxide and oxygen from the other.

Figure 2:
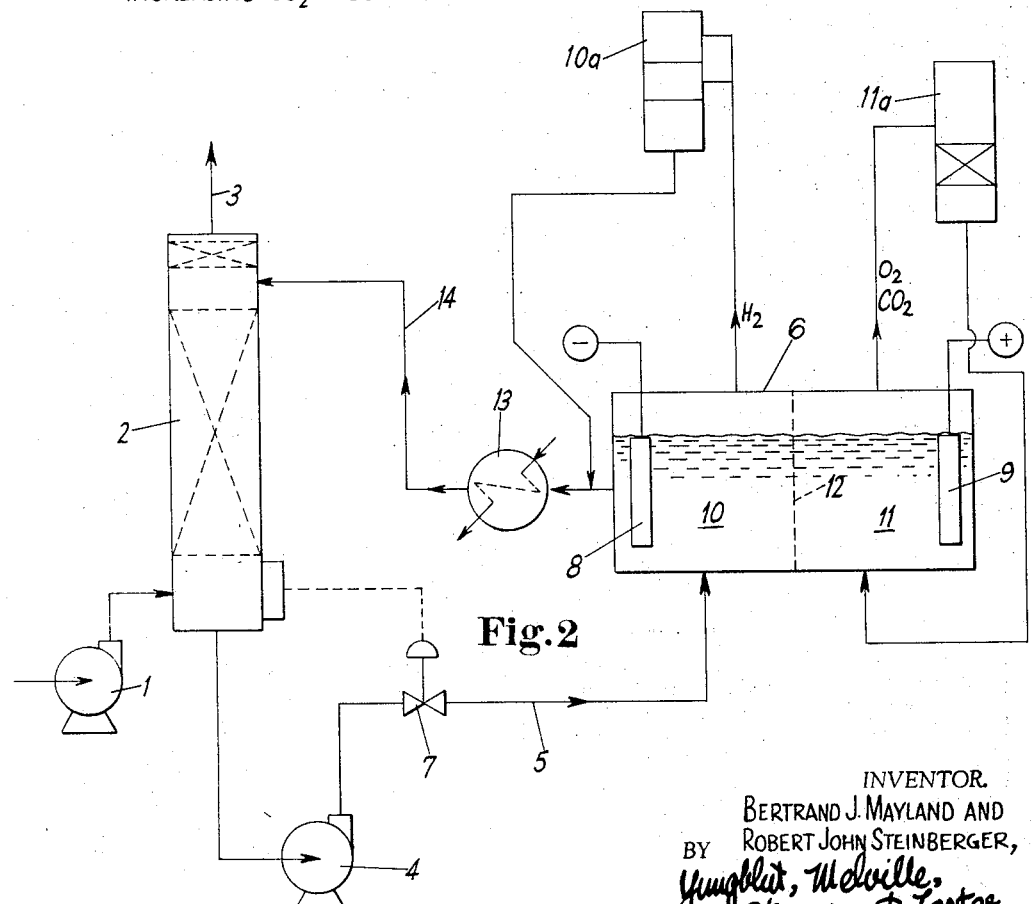
FIG. 2 is a diagrammatic representation of a simple absorption and regeneration system employing the principles of the invention.

Referring now to FIG. 2, which is diagrammatically illustrative of a simplified system suitable for use in a submarine, air containing a greater than desired quantity of carbon dioxide is delivered by a blower 1 to an absorber tower 2. In this tower, which contains a suitable packing or other means for bringing the air into intimate contact with the absorber solution, the air is scrubbed by means of a water solution of potassium carbonate containing a relatively small amount of free potassium hydroxide. The absorption efficiency is high, and the carbon dioxide is reduced to a low level in a tower of comparatively small dimensions. The scrubbed air is shown issuing from the absorber at 3 where it is carried by a conduit to a cooling system. It will be understood that the air is treated with oxygen as may be required before being reintroduced into the living and operating spaces in the submarine.

The spent solution, which now contains potassium carbonate and potassium bicarbonate, collects in the bottom of the tower and is transferred by a pump 4 through a conduit 5 to an electrolytic cell 6. The transfer may be regulated by an automatic valve 7 in the conduit 5 and having connection with the sump in the bottom of the absorber tower.

A suitable construction for the electrolytic cell will later be described. However, it will be noted from FIG. 2 that the cell has a cathode 8 and an anode 9 of carbon or other suitably inert electroconductive material. It will also be noted that the cell is divided into compartments 10 and 11 by an anion exchange membrane 12. An anion exchange membrane is generally a pervious support coated with an anion exchange resin. Anion exchange resins are generally in the free base (sometimes called "hydroxyl") form, an example of which is chloromethylated styrene divinyl benzene copolymer, aminated with trimethylamine. Amberlite IR–410, Amberlite IR–401, Amberlite IR–45, Amberlite IR–400, and Amberlite IRA–410 are trademarks for resins of this class, made and sold by Rohm and Haas Company, and are suitable anion resins.

The result of the electrodialysis carried on in the cell 6 is the separate evolution of hydrogen at the cathode in compartment 10 and of a mixture of carbon dioxide and oxygen in compartment 11 at the anode 9, together with the reconversion of potassium bicarbonate to potassium carbonate and the regeneration of potassium hydroxide. The regenerated solution from the electrolytic cell, which generally will have been raised in temperature during the electrodialysis, may be reduced in temperature by a cooler 13 and transferred by a conduit 14 to the top of the absorber tower for reuse as shown. With solutions of the class hereinabove set forth, absorption may be carried on to advantage at a slightly elevated temperature, say, about 180° F. It will be understood that a pump may be used in the conduit 14.

The hydrogen and the mixture of carbon dioxide and oxygen can be separately vented to the outside of the submarine without danger. The origin of the hydrogen and oxygen is, of course, the decomposition of water during the electrodialysis. Water make-up will be practiced as required. The solution to be regenerated is confined to compartment 10. Compartment 11 contains any suitable acid electrolyte.

The separation of the generated gases from the electrolytes in the cell chambers, or the separation of entrained electrolyte droplets from the gases, may require the use of conventional separators as indicated at 10a and 11a in FIG. 2. Although not illustrated therein, it will be understood that similar separators and flow circuits may be used with the cell compartments shown in FIGS. 3 and 4. In any flow circuits, pumps may be used to enforce circulation, whether or not shown in the drawings.

Figure 3:
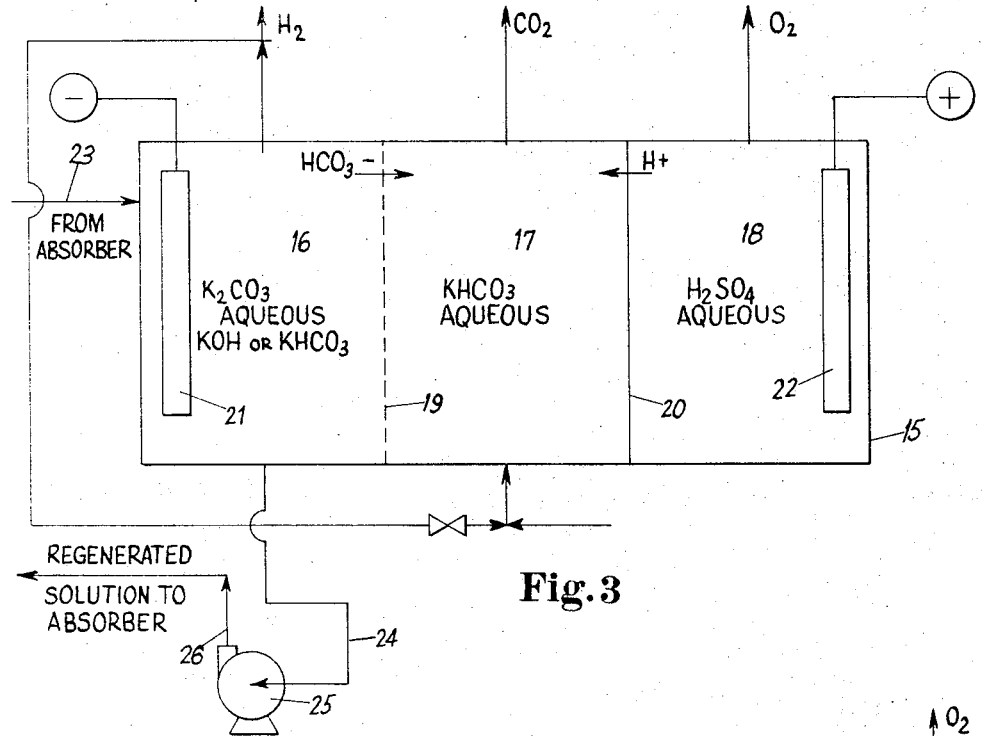
FIG. 3 is a diagrammatic representation of a more elaborate form of electrodialysis cell.

FIG. 3 illustrates diagrammatically a somewhat more elaborate electrolytic cell 15. This cell is divided into three compartments 16, 17 and 18 by an anion exchange membrane 19 and by a cation exchange membrane 20. A cation exchange membrane preferably comprises a foraminous support covered by a cation exchange resin so as to be impervious to the electrolyte. Cation resins are generally in a form which may be written $RSO_2H$, an example being a sulfonated divinyl benzene copolymer. Resins of this class are sold by Rohm and Haas Company under trademarks such as Amberlite IR–120, Amberlite IR–122, Amberlite IR–124 and Amberlite IRC–50.

The electrolytic cell 15 contains a cathode 21 in compartment 16 and an anode 22 in compartment 18, these electrodes being connected to a suitable source of power.

The spent solution from the absorber enters the compartment 16, as at 23, and is regenerated therein both as to its content of potassium carbonate and as to its content of potassium hydroxide by an electrolytic action above described. The regenerated stripping solution is withdrawn from compartment 16 through a conduit 24 and is returned by means of pump 25 and a conduit 26 to the absorber.

The second compartment 17 is marked as containing an aqueous potassium bicarbonate solution. Acid bicarbonate ions enter through the anion exchange membrane 19 while hydrogen ions enter through the cation exchange membrane 20. The chemical result is the formation of some water and the evolution of some carbon dioxide.

The third compartment 18 is shown as containing a suitable electrolyte, such as an aqueous sulfuric acid solution. Here the result of electrolysis will be the transfer of hydrogen ions through the membrane 20 and the evolution of oxygen at the cathode 22.

The arrangement shown in FIG. 3 has the advantage that the gases hydrogen, carbon dioxide and oxygen are separately derived and collected and may be used or vented separately. It is possible, if desired, to circulate some of the hydrogen back to the compartment 17 to aid in gas stripping.

The separate evolution of the several gases hydrogen, oxygen and carbon dioxide is in many instances highly desirable. Uncontaminated oxygen can, of course, be reintroduced into the breathing atmosphere of a submarine or a fallout shelter. Hydrogen can often be used as fuel in burners or fuel cells. Carbon dioxide can sometimes be vented from a submarine in gaseous form. Where this is not feasible, there are various alternatives. The carbon dioxide may be liquefied by cryogenic heat exchange with the oxygen supply of the submarine, and stored. Also it is possible to convert a mixture of hydrogen and carbon dioxide to the form of a liquid hydrocarbon by a Fischer-Tropsch type of reaction.

Figure 4:
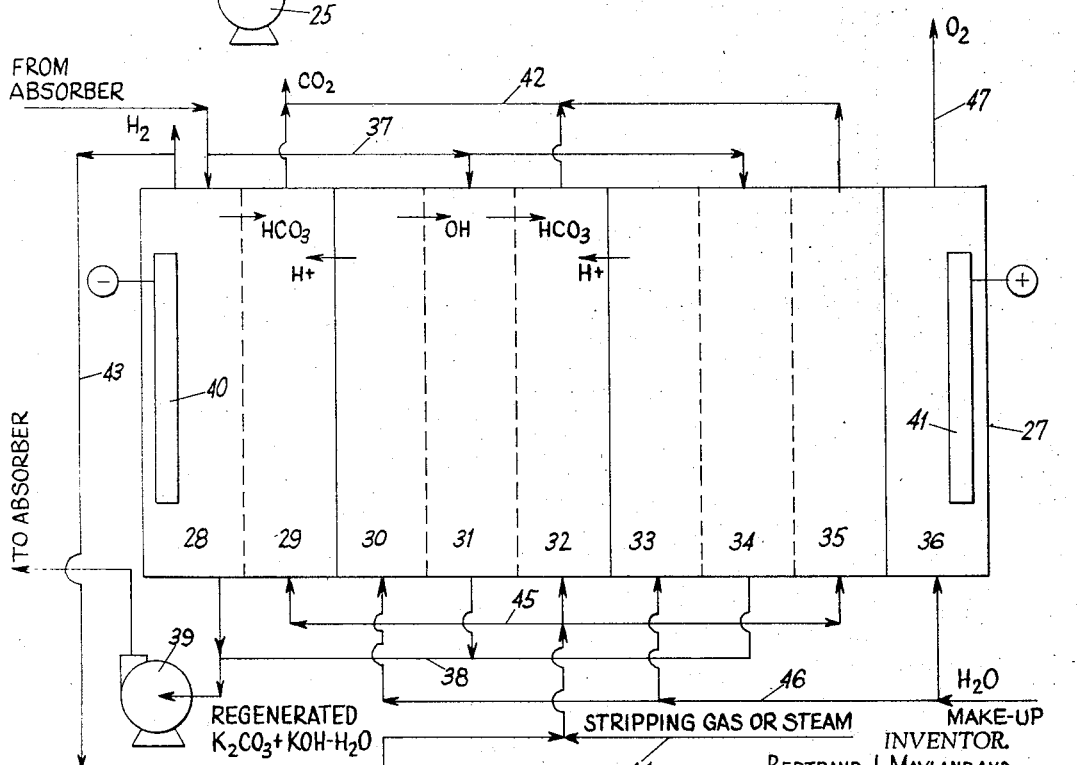
FIG. 4 is a diagrammatic representation of an electrolytic means employing multiple cell regeneration.

A still more elaborate electrolytic arrangement is shown in FIG. 4 as comprising a cell 27 divided into a series of compartments 28 to 36, which compartments are separated by anion exchange membranes indicated in dotted lines and cation exchange membranes indicated in solid lines. The solution from the absorber is delivered by a branched conduit system 37 to compartments 28, 31 and 34. The regenerated solution from these compartments is delivered by a branched conduit system 38 to the pump 39 by means of which it is returned to the absorber. Compartment 28 contains a cathode 40, while compartment 36 contains an anode 41.

The nature of the solutions in the other compartments will be clear from the description above. Carbon dioxide will be released in compartments 29, 32 and 35 and may be collected and vented by a branched conduit system 42. Hydrogen will be evolved from compartment 28. Conduit means 43 may be employed to recirculate the hydrogen, along with any other stripping gas or steam, the use of which is desired, entering the system through a conduit 44. The recirculated gas is conducted to compartments 29, 32 and 35 by a branched conduit 45. Make-up water may be introduced into compartments 30, 33 and 36 through a branched conduit system 46. Oxygen can be vented from the system at 47. The actions going on in several compartments will be clear from the explanation above.

The reactions carried on in the electrolytic regenerator would result in ¼ mol of oxygen with every mol of $CO_2$ at the anode and ½ mol of hydrogen at the cathode. The theoretical electrical quantity for this would be one Faradays or 96493 coulombs/gm. mol of $CO_2$. The net reaction is the decomposition of water. The theoretical electrical energy then is the standard free energy of this reaction, $H_2O = H_2 + \frac{1}{2}O_2$. This amounts to 99,000 B.t.u./Lb. mol of $H_2O$ or in terms of $CO_2$, 130 B.t.u./SCF of $CO_2$.

FIG. 5 illustrates a simple form of electrolytic apparatus which is not only self-contained, but will be non-spilling. The apparatus consists in a first end closure plate 48. Against this there will be placed a hollowed insulative element 49, preferably of resinous substance so as to form a cell compartment which will be closed upon the one side by the insulative plate 48, and on the other side by an ion exchange membrane 50. The first cell or compartment will contain a cathode 51 shaped to fit within the compartment, being made of any suitable conductive substance, and having an electrical lead 52. The hollowed insulative member 49 is shown as provided with a plurality of fluid inlets or outlets 53, 54 and 55, together with a hole 56 for the passage of the lead 52.

The next element will be another hollowed insulative element 57 which, in the completed structure, will be covered on one side with the ion exchange membrane 50, and on the other side with an ion exchange membrane 58. A third hollowed insulative member is indicated at 59 and a final closure plate 60, also indicated; but it will be understood by the skilled worker in the art that while FIG. 5 shows the elements of a 3-compartment cell, these elements may be multiplied by any number required to make up a cell having more compartments, such as that illustrated in FIG. 4.

Any of the hollowed insulative elements may be provided with inlet and outlet openings, as required for the particular chemical changes going on in the particular compartment. These have not been illustrated excepting in the case of the hollow member 49. Also, it will be understood that if the hollow member 59 is used to form the last compartment in the cell construction, that construction will contain an anode (not shown) of the same general form and characteristics as the cathode 51 and its lead 52.

The several illustrated parts, excepting the electrodes, will be provided with holes 61 for the passage of bolts to hold all of the elements together in a liquid- and gas-tight fashion. One of the bolts is illustrated at 62 in the figure. It will be understood that the several parts are intended to come into sealing relationship with each other; but the use of gaskets for sealing purposes does not depart from the spirit of the invention.

Modifications may be made in the invention without departing from the spirit of it. The invention having been described in certain exemplary embodiments, what is claimed as new and desired to be secured by Letters Patent is:

1. A process for the removal of carbon dioxide from a gaseous atmosphere to render said atmosphere suitable for re-breathing which comprises subjecting the said atmosphere to a solution of an alkali metal carbonate and an alkali metal hydroxide so as to absorb carbon dioxide from the said atmosphere with the formation of acid carbonate from the carbonate and carbonate from the hydroxide, the solution thereby becoming spent, and then regenerating the spent solution for reuse by subjecting it to electrolysis to the extent of converting the acid carbonate to the normal carbonate salt and to the extent of regenerating the hydroxide, the said electrolysis being carried on in a cell having at least two compartments separated by an anion exchange membrane, the first of said compartments containing a cathode and being the compartment into which the spent solution is introduced and from which the regenerated solution is withdrawn, the polarity conditions in the second of said compartments being anodic with respect to the conditions in the first compartment, said second compartment containing a separate electrolyte, whereby hydrogen is evolved in the first compartment and carbon dioxide is evolved in the second compartment.

2. The process claimed in claim 1 wherein the regenerated solution contains the said carbonate in a concentration of about 18% to about 28%, and the said hydroxide in a concentration of about 1% to about 2%.

3. The process claimed in claim 1 wherein the electrolytic cell has a third compartment separated from the second compartment by a cation exchange membrane, the said third compartment containing a separate dilute acid electrolyte and an anode, whereby hydrogen, carbon dioxide and oxygen are evolved separately and respectively from said first, second and third compartments.

4. The process claimed in claim 1 including the steps of circulating the electrolyte between the first compartment and a means for associating it with the said atmosphere, and maintaining a circulation of the electrolyte within the second of said compartments.

5. The process claimed in claim 3 including the steps of recirculating the electrolyte in the first compartment between it and a means for associating the regenerated solution with the said atmosphere, and the steps of maintaining a circulation of the respective electrolytes in the second and third compartments.

6. The process claimed in claim 3 including the steps of recirculating the electrolyte in the first compartment between it and a means for associating the regenerated solution with the said atmosphere, and the steps of maintaining a circulation of the respective electrolytes in the second and third compartments while stripping evolved gases therefrom.

7. The process claimed in claim 6 wherein the electrolytes are respectively withdrawn from the said compartments and returned thereto after being subjected to a stripping operation.

8. The process claimed in claim 7 wherein the stripping operation is assisted by the introduction into the electrolytes of a compatible stripping gas.

References Cited

UNITED STATES PATENTS

| | | | |
|---|---|---|---|
| 1,290,244 | 1/1919 | Kramers | 48—128 |
| 2,545,194 | 3/1951 | Colburn et al. | 55—68 |
| 2,726,930 | 12/1955 | Edwards et al. | 204—103 |
| 2,794,777 | 6/1957 | Pearson | 204—180 X |
| 3,282,834 | 11/1966 | Justi et al. | 204—98 X |

JOHN H. MACK, *Primary Examiner.*

D. R. VALENTINE, *Assistant Examiner.*